United States Patent
Reicher et al.

(10) Patent No.: US 9,141,329 B1
(45) Date of Patent: Sep. 22, 2015

(54) COMBINING ELECTRONIC DISPLAYS

(71) Applicant: DR Systems, Inc., San Diego, CA (US)

(72) Inventors: Murray A. Reicher, Rancho Santa Fe, CA (US); Florent Saint-Clair, San Diego, CA (US); Evan K. Fram, Paradise Valley, AZ (US)

(73) Assignee: D.R. Systems, Inc., San Diego, CA (US)

( * ) Notice: Subject to any disclaimer, the term of this patent is extended or adjusted under 35 U.S.C. 154(b) by 68 days.

(21) Appl. No.: 13/952,498

(22) Filed: Jul. 26, 2013

Related U.S. Application Data

(60) Provisional application No. 61/676,575, filed on Jul. 27, 2012.

(51) Int. Cl.
*G06F 3/14* (2006.01)

(52) U.S. Cl.
CPC ........ *G06F 3/1446* (2013.01); *G09G 2300/026* (2013.01)

(58) Field of Classification Search
CPC . G06F 3/1446; G09G 2300/026; F16M 13/02
USPC .................................................. 345/1.1–3.4
See application file for complete search history.

(56) References Cited

U.S. PATENT DOCUMENTS

| | | | |
|---|---|---|---|
| 5,422,751 A | 6/1995 | Lewis | |
| 6,201,554 B1* | 3/2001 | Lands | 345/169 |
| 8,412,269 B1 | 4/2013 | Cook | |
| 2002/0113751 A1* | 8/2002 | Knopf | 345/4 |
| 2003/0015632 A1* | 1/2003 | Dunn et al. | 248/122.1 |
| 2004/0150582 A1 | 8/2004 | Dunn | |
| 2005/0178034 A1* | 8/2005 | Schubert et al. | 40/605 |
| 2007/0176848 A1* | 8/2007 | Ferren et al. | 345/6 |
| 2008/0052746 A1* | 2/2008 | Cooper et al. | 725/80 |
| 2008/0284694 A1 | 11/2008 | Dunn | |
| 2011/0209177 A1 | 8/2011 | Sela | |
| 2011/0279224 A1 | 11/2011 | Jang | |
| 2012/0225645 A1 | 9/2012 | Sivan | |
| 2012/0282905 A1 | 11/2012 | Owen | |
| 2012/0287021 A1 | 11/2012 | Park | |
| 2013/0188098 A1 | 7/2013 | Higashi | |
| 2013/0324035 A1 | 12/2013 | Strommen | |
| 2014/0184472 A1* | 7/2014 | Xia et al. | 345/1.3 |

(Continued)

OTHER PUBLICATIONS

"LG Multi-Vision Display," Brochure, retrieved from http://www.networkspectrum.com/gsaschedule/Product%20Specifications/LG/Video%20Wall/60PJ10BUNDLE.pdf, last accessed Jul. 18, 2013.

(Continued)

*Primary Examiner* — Larry Sternbane
(74) *Attorney, Agent, or Firm* — Knobbe, Martens, Olson & Bear LLP

(57) ABSTRACT

Disclosed herein are systems and methods for combining two or more physical electronic displays into a single, unified electronic display. In an embodiment, two or more displays are combined into a single combined display by removing display bezel sections that exists between the combined displays. In another embodiment, two or more display panels (such as LCD panels) are combined into a single display by coupling a single combined bezel, backlight, and/or power supply to the combined display panels. Such a combined electronic display may provide a significantly reduced cost as compared to a similarly sized single electronic display. Additionally, a combined display may provide sizes that are currently unavailable in single electronic display.

22 Claims, 7 Drawing Sheets

(56) References Cited

U.S. PATENT DOCUMENTS

2014/0211099 A1 7/2014 Saha
2014/0268654 A1 9/2014 Wagner

OTHER PUBLICATIONS

"Air Display" by Avatron Software, Android Apps on Google Play, http://play.google.com/store/apps/details?id=com.avatron.airdisplay&hl=en, last accessed Jul. 18, 2013.
"Air Display" by Avatron Software, Inc., http://itunes.apple.com/us/app/air-display/id368158927?rmt=8, last accessed Jul. 18, 2013.
AGFA HealthCare, color brochure "IMPAX 6: Digital Image and Information Management," © 2012 Agfa HealthCare N.V. Downloaded from http://www.agfahealthcare.com/global/en/he/library/libraryopen?ID=32882925. Accessed on Feb. 9, 2015.
AGFA HealthCare, IMPAX 6.5 Datasheet (US)2012. © 2012 Agfa HealthCare N.V. Downloaded from http://www.agfahealthcare.com/global/en/he/library/libraryopen?ID=37459801. Accessed on Feb. 9, 2015.
AMD Technologies, Inc., Catella PACS 5.0 Viewer User Manual (112 pgs), © 2010, AMD Technologies, Inc. (Doc. 340-3-503 Rev. 01). Downloaded from http://www.amdtechnologies.com/lit/cat5viewer.pdf. Accessed on Feb. 9, 2015.
Aspyra's Imaging Solutions, 3 page color print out. Accessed at http://www.aspyra.com/imaging-solutions. Accessed on Feb. 9, 2015.
Avreo, interWorks—RIS/PACS package, 2 page color brochure, © 2014, Avreo, Inc. (Document MR-5032 Rev. 4). Downloaded from http://www.avreo.com/ProductBrochures/MR-5032Rev.%204.interWORKS%20RISPACSPackage.pdf. Accessed on Feb. 9, 2015.
BRIT Systems, BRIT PACS View Viewer, 2 page color brochure, (BPB-BPV-0001). Downloaded from http://www.brit.com/pdfs/britpacsview.pdf. Accessed on Feb. 9, 2015.
BRIT Systems, Roentgen Works—100% Browers-based VNA (Vendor Neutral Archive/PACS), © 2010 BRIT Systems, 1 page color sheet. Accessed at http://www.roentgenworks.com/PACS. Accessed on Feb. 9, 2015.
BRIT Systems, Vision Multi-modality Viewer—with 3D, 2 page color brochure, (BPB-BVV-0001 REVC). Downloaded from http://www.brit.com/pdfs/BPB-BVV-0001REVC_BRIT_Vision_Viewer.pdf. Accessed on Feb. 9, 2015.
CANDELiS, ImageGrid™: Image Management Appliance, 6 page color brochure. (AD-012 Rev. F Nov. 2012), © 2012 Candelis, Inc. Downloaded from http://www.candelis.com/images/pdf/Candelis_ImageGrid_Appliance_20111121.pdf. Accessed on Feb. 9, 2015.
Carestream, Cardiology PACS, 8 page color brochure. (CAT 866 6075 06/12). © Carestream Health, Inc., 2012. Downloaded from http://www.carestream.com/cardioPACS_brochure_M1-877.pdf. Accessed on Feb. 9, 2015.
Carestream, Vue PACS, 8 page color brochure. (CAT 300 1035 05/14). © Carestream Health, Inc., 2014. Downloaded from http://www.carestream.com/csPACS_brochure_M1-876.pdf. Accessed on Feb. 9, 2015.
Cerner, Radiology—Streamline image management, 2 page color brochure, (fl03_332_10_v3). Downloaded from http://www.cerner.com/uploadedFiles/Clinical_Imaging.pdf. Accessed on Feb. 9, 2015.
CoActiv, EXAM-PACS, 2 page color brochure, © 2014 CoActiv, LLC. Downloaded from http://coactiv.com/wp-content/uploads/2013/08/EXAM-PACS-BROCHURE-final-web.pdf. Accessed on Feb. 9, 2015.
DR Systems, Dominator™ Guide for Reading Physicians, Release 8.2, 546 pages, (TCP-000260-A), © 1997-2009, DR Systems, Inc. Downloaded from https://resources.dominator.com.assets/004/6999.pdf. Document accessed Feb. 9, 2015.
DR Systems, DR Scheduler User Guide, Release 8.2, 410 pages, (TCP-000115-A), © 1997-2009, DR Systems, Inc. Downloaded from https://resources.dominator.com/assets/003/6850.pdf. Document accessed Feb. 9, 2015.
Fujifilm Medical Systems, SYNAPSE® Product Data, Synapse Release Version 3.2.1, Foundation Technologies, 4 page color brochure, (XBUSSY084) Aug. 2008. Downloaded from http://www.fujifilmusa.com/shared/bin/foundation.pdf Accessed on Feb. 9, 2015.
Fujifilm Medical Systems, SYNAPSE® Product Data, Synapse Release Version 3.2.1, Server Modules and Interfaces, 4 page color brochure, (XBUSSY085) Aug. 2008. Downloaded from http://www.fujifilmusa.com/shared/bin/server-interface.pdf. Accessed on Feb. 9, 2015.
Fujifilm Medical Systems, Synapse® Product Data, Synapse Release Version 3.2.1, Workstation Software, 4 page color brochure, (XBUSSY082) Aug. 2008. Downloaded from http://www.fujifilmusa.com/shared/bin/workstation.pdf. Accessed on Feb. 9, 2015.
GE Healthcare, Centricity PACS, in 8 page printout. Accessed at http://www3.gehealthcare.com/en/products/categories/healthcare_it/medical_imaging_informatics_-_ris-pacs-cvis/centricity_pacs. Accessed on Feb. 9, 2015.
Handylife.com—Overview of Handy Patients Enterprise, in 2 page printout. Accessed from http://www.handylife.com/en/software/overview.html. Accessed on Feb. 18, 2015.
Handylife.com—Features of Handy Patients Enterprise, in 4 page printout. Accessed from http://www.handylife.com/en/software/features.html. Accessed on Feb. 18, 2015.
Handylife.com—Screenshots of Handy Patients Enterprise, in 2 page printout. Accessed from http://www.handylife.com/en/software/screenshots.html. Accessed on Feb. 18, 2015.
iCRco, I See The Future, in 12 pages, color brochure, (BR080809AUS), © 2009 iCRco.ClarityPACS. Downloaded from http://www.claritypacs.com/pdfs/ISeeFuture_26_Web.pdf. Accessed on Feb. 9, 2015.
Imageanalysis, dynamika, 2 page color brochure. Downloaded from http://www.imageanalysis.org.uk/what-we-do. Accessed on Feb. 9, 2015.
Imageanalysis, MRI Software, in 5 page printout. Accessed at http://imageanalysis.org.uk/mri-software. Accessed on Feb. 9, 2015.
IMSI, Integrated Modular Systems, Inc., Hosted / Cloud PACS in one page printout. Accessed at http://www.imsimed.com/#!products-services/ctnu. Accessed on Feb. 9, 2015.
Infinitt, PACS, RIS, Mammo PACS, Cardiology Suite and 3D/Advanced Visualization | Infinittna, 2 page printout. Accessed at http://www.infinittna.com/products/radiology/radiology-pacs. Accessed on Feb. 9, 2015.
Intelerad, IntelePACS, 2 page color brochure, © 2014 Intelerad Medical Systems Incoprorated. Downloaded http://www.intelerad.com/wp-content/uploads/sites/2/2014/08/IntelePACS-brochure.pdf. Accessed on Feb. 9, 2015.
Intelerad, InteleViewer, 2 page color brochure, © 2014 Intelerad Medical Systems Incoprorated. Downloaded from http://www.intelerad.com/wp-content/uploads/sites/2/2014/09/InteleViewer-brochure.pdf. Accessed on Feb. 9, 2015.
Intuitive Imaging Informatics, ImageQube, 1 page in color. Downloaded from http://www.intuitiveimaging.com/2013/pdf/imageQube%20one-sheet.pdf. Accessed on Feb. 9, 2015.
Kuhl, Helen: Comparison Chart/PACS, Customers Are Happy, But Looking for More, (color) Imaging Techology News, itnonline.com, May 2012, pp. 24-27. Downloaded from http://www.merge.com/MergeHealthcare/media/company/In%20The%20News/merge-pacs-comparison.pdf. Accessed on Feb. 9, 2015.
Lumedx CardioPACS 5.0 Web Viewer, Cardiopacs Module, 2 page color brochure, (506-10011 Rev A). Downloaded from http://cdn.medicexchnge.com/images/whitepaper/cardiopacs_web_viewer.pdf?1295436926. Accessed on Feb. 9, 2015.
Lumedx Cardiovascular Information System, CardioPACS, one page in color printout. Accessed at http://www.lumedx..com/pacs.aspx. Accessed on Feb. 9, 2015.
McKesson Enterprise Medical Imaging and PACS | McKesson, 1 page (color) printout. Accessed at http://www.mckesson.com/providers/health-systems/diagnostic-imaging/enterprise-medical-imaging. Accessed on Feb. 9, 2015.
Medweb Radiology Workflow Solutions, Radiology Workflow Solutions, Complete Workflow & Flexible Turnkey Solutions, Web RIS/

(56) References Cited

OTHER PUBLICATIONS

PACS with Advanced Viewer, 3 page color brochure, © 2006-2014 Medweb. Downloaded from http://medweb.com/docs/rispacs_brochure_2014pdf. Accessed on Feb. 9, 2015.
Merge Radiology Solutions, Merge PACS, A real-time picture archiving communication system, (PAX-21990 rev 2.0), 2 page color brochure. Downloaded from http://www.merge.com/MergeHealthcare/media/documents/brochures/Merge_PACS_web.pdf. Accessed on Feb. 9, 2015.
Novarad Enterprise Imaging Solutions, NOVAPACS, 2 page (color) printout. Accessed at http://ww1.novarad.net/novapacs. Accessed on Feb. 9, 2015.
PACSPLUS, PACSPLUS Server, 1 page (color) printout. Accessed at http://pacsplus.com/01_products/products_01.html. Accessed on Feb. 9, 2015.
PACSPLUS, PACSPLUS Workstation, 3 page (color) printout. Accessed at http://www.pacsplus.com/01_products/products_01.html. Accessed on Feb. 9, 2015.
Philips IntelliSpace PACS, in 2 color page printout. Accessed at https://www.healthcare.philips.com/main/products/healthcare_informatics/products/enterprise_imaging_informatics/isite_pacs. Accessed on Feb. 9, 2015.
RamSoft, RIS PACS Teleradiology, PowerServer PACS, Lite PACS, XU PACS Compare RamSoft PACS Products, 2 color page printout. Accessed at http://www.ramsoft.com/products/powerserver-pacs-overview. Accessed on Feb. 9, 2015.
Sage Intergy PACS | Product Summary. Enhancing Your Workflow by Delivering Web-based Diagnostic Images When and Where You Need Them, in 2 color pages. (IRV-SS-INTPACS-PSS-031309). © 2009 Sage Software Healcare, Inc. Downloaded from http://www.greenwayhealth.com/solutions/intergy/. Accessed on Feb. 9, 2015.
ScImage, Cardiology PACS, in 8 color page printout. Accessed at http://www.scimage.com/solutions/clinical-solutions/cardiolooy. Accessed on Feb. 9, 2015.
Sectra RIS PACS, in 2 color page printout. Accessed at https://www.sectra.com/medical/diagnostic_imaging/solutions/ris-pacs/. Accessed on Feb. 9, 2015.
Siemens syngo.plaza, Features and Benefits, in 2 color page printout. Accessed at http://www.healthcare.siemens.com/medical-imaging-it/imaging-it-radioloy-image-management-pacs/syngoplaza/features. Accessed on Feb. 9, 2015.
Simms | RIS and PACS Medical Imaging Software, in 2 color page printout. http://www.mysimms.com/ris-pacs.php. Accessed on Feb. 9, 2015.
Stryker, Imaging—OfficePACS Power Digital Imaging, in one color page printout. Accessed from http://www.stryker.com/emea/Solutions/Imaging/OfficePACSPowerDigitalImaging/index.htm. Accessed on Feb. 9, 2015.
Stryker, OfficePACS Power—Digital Imaging, 8 page color brochure, (MPP-022 Rev 4 BC/MP 300 1/07). © 2007 Stryker. Downloaded from http://www.stryker.com/emea/Solutions/Imaging/OfficePACSPowerDigitalImaging/ssLINK/emea/1557/022268. Accessed on Feb. 9, 2015.
UltraRAD—ultra Vision, 1 page (color). Downloaded from http://www.ultraradcorp.com/pdf/UltraVISION.pdf. Accessed on Feb. 9, 2015.
VioStream for VitreaView, 2 color pages printout. Accessed at http://www.vitalimages.com/solutions/universal-viewing/viostream-for-vitreaview. Accessed on Feb. 9, 2015.
Visage Imaging Visage 7, 3 color page printout. Accessed at http://www.visageimaging.com/visage-7. Accessed on Feb. 9, 2015.
Viztek Radiology PACS Software Vixtek Opal-RAD, 4 color page printout. Accessed at http://viztek.net/products/opal-rad. Accessed on Feb. 9, 2015.
Voyager Imaging—Voyager PACS Radiologist Workstation, 2 page color brochure. Downloaded from http://www.intellirad.com.au/assets/Uploads/Voyager-PacsWorkstations.pdf?. Accessed on Feb. 9, 2015.
Voyager Imaging—Voyager PACS, 3 page color brochure. Downloaded from http://www.intellirad.com.au/index.php/assets/Uploads/Voyager-Pacs3.pdf. Accessed on Feb. 9, 2015.

\* cited by examiner

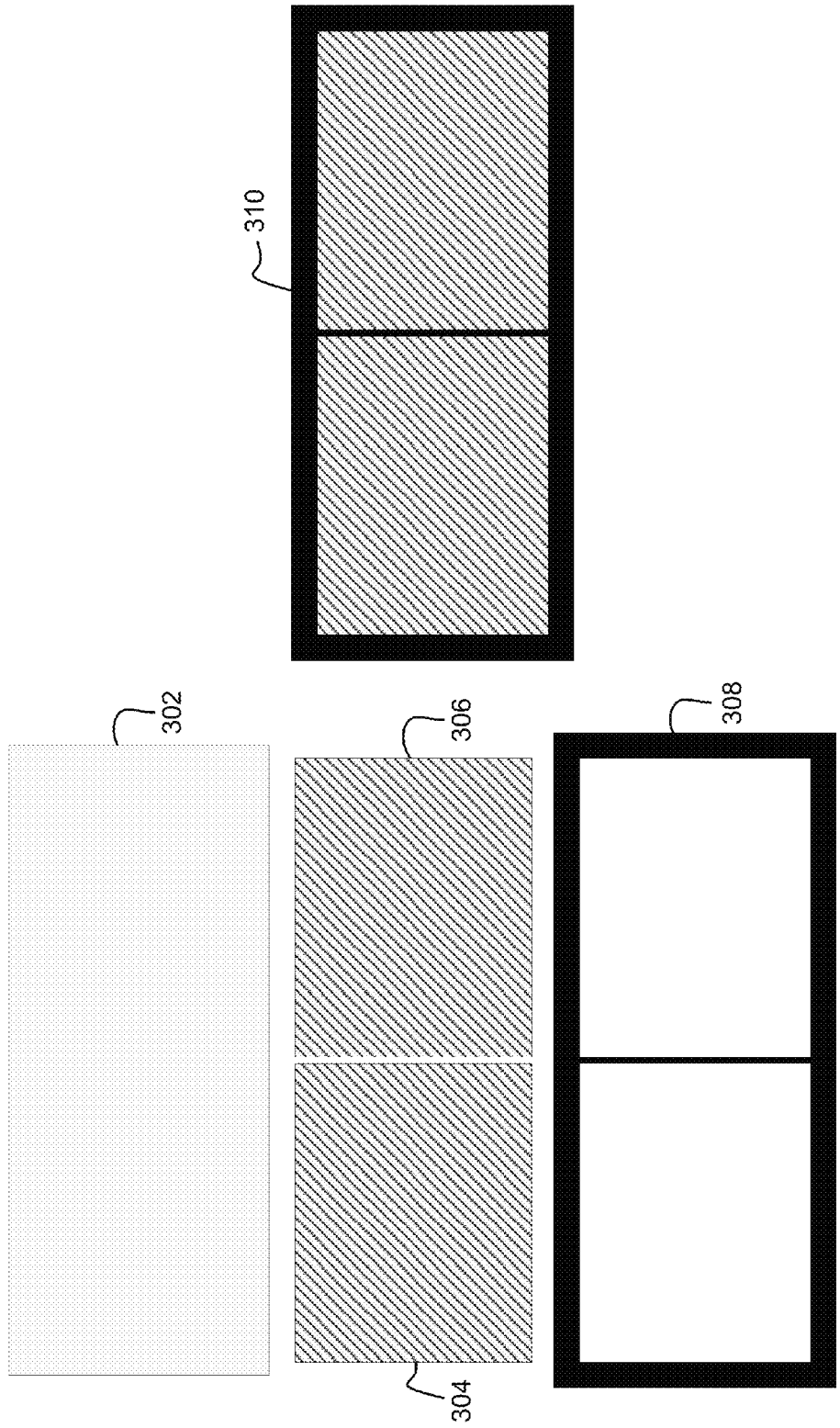

COMBINING ELECTRONIC DISPLAYS

CROSS-REFERENCE TO RELATED APPLICATIONS

This application claims the benefit of priority under 35 U.S.C. §119(e) of U.S. Provisional Application No. 61/676,575, filed Jul. 27, 2012, the disclosure of which is hereby incorporated by reference in its entirety.

This application is related to co-pending U.S. patent application Ser. No. 13/952,496, filed concurrently herewith, and titled "MOBILE COMPUTER INPUT DEVICES," which is hereby incorporated by reference in its entirety.

BACKGROUND

The volume of digitally accessible information continues to grow rapidly. At the same time, the screen size of computing devices continues to shrink with the widespread adoption of handheld computing devices such as smartphones and tablets. Additionally, large displays may be prohibitively expensive in some applications in which they would be advantageous.

SUMMARY

In one embodiment, a method of combining electronic displays comprises providing two electronic displays, each configured to independently receive input data and display representations of said input data, determining a particular arrangement of the two electronic displays with reference to one another, based on the particular arrangement, removing a bezel on at least a first side of the first electronic display and on at least a second side of the second electronic display, wherein the first side and the second side are opposite sides, and physically coupling the two electronic displays together in the particular arrangement so that the first side of the first electronic display directly abuts the second side of the second electronic display in order to create a unified electronic display.

In one embodiment, a method of combining two or more electronic displays comprises providing two or more electronic displays, each configured to receive input data and display representations of said input data, determining a particular arrangement of the two or more electronic displays, removing an entire bezel from each of the two or more electronic displays, providing a shared bezel based on the particular arrangement, physically coupling each of the two or more electronic displays together in the particular arrangement in order to create a unified electronic display, and physically coupling the shared bezel to the unified electronic display.

In one embodiment, a method of fabricating an electronic display comprises providing two or more electronic display panels, arranging the two or more electronic display panels in a predetermined pattern with reference to one another, physically coupling each of the two or more electronic display panels to at least one adjacent display panel, and coupling one or more shared display components with the two or more electronic display panels to create a unified electronic display.

BRIEF DESCRIPTION OF THE DRAWINGS

FIGS. 3A-3B illustrate another method for combining two physical displays into one physical display, according to an embodiment of the present disclosure.

DETAILED DESCRIPTION

Figure 1:
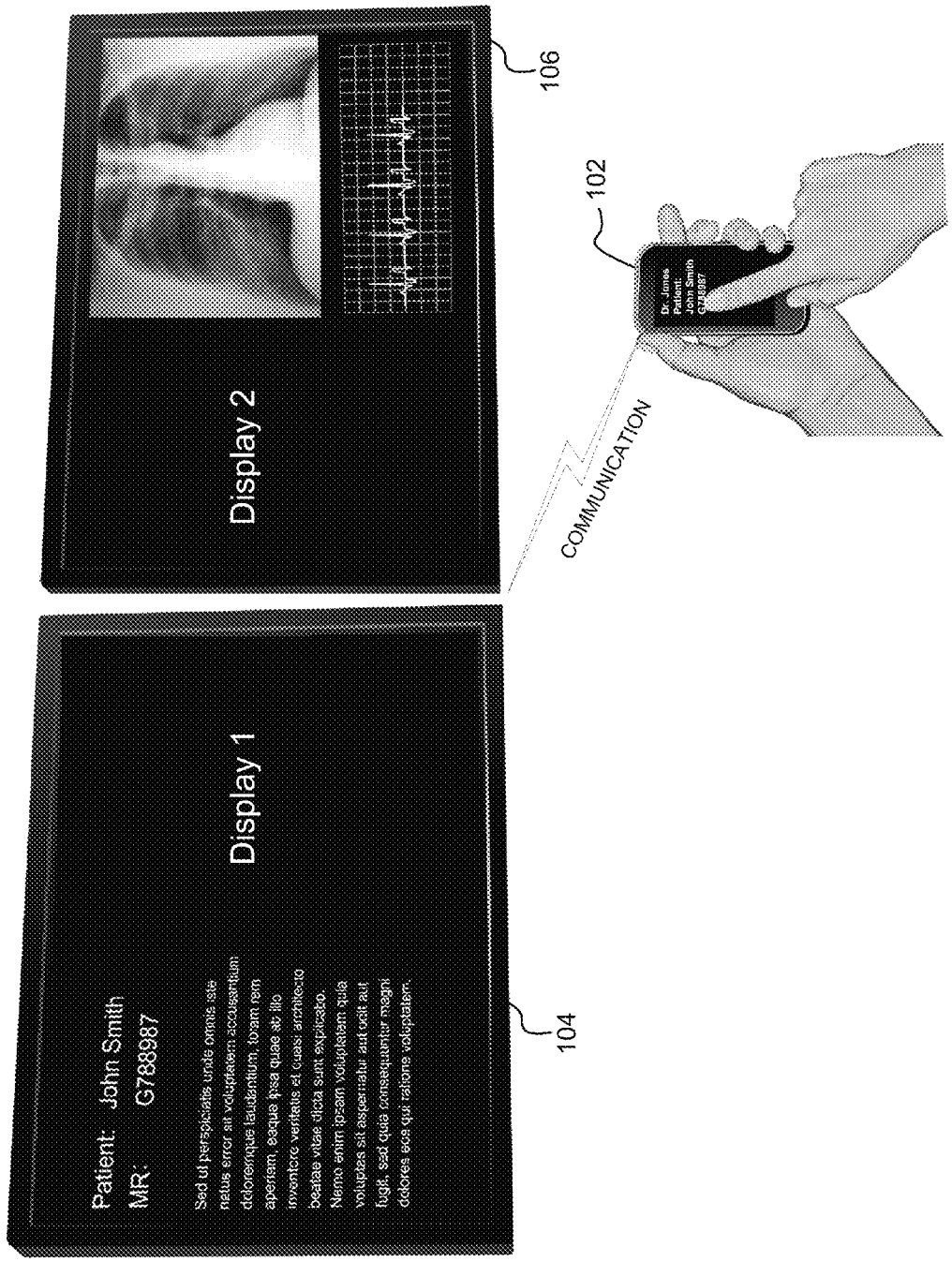
FIG. 1 illustrates a mobile computing device communicating with one or more parent computing systems including multiple displays, according to an embodiment of the present disclosure.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Within the present disclosure, the terms "mobile computing device," "mobile computer device," "mobile device," and the like may be used interchangeably to refer to any computing device, such as computing device 150a (see discussion of FIG. 6 below), that provides for display to, and/or input from, a user. Examples of mobile devices that may be used in the systems and methods of the present disclosure include, but are not limited to, handheld devices (such as a notebook computers, tablet computers, personal digital assistants (PDAs), hybrid PDA/mobile phones, mobile phones, smartphones, electronic book readers, and/or digital media players), gaming devices, and/or integrated component(s) for inclusion in other devices, among others. For ease of description, the systems and methods described herein are discussed with reference to a tablet or smartphone mobile device; however, any other type of mobile device may be used.

Further, within the present disclosure, the terms "parent computing system," "parent system," "parent computing device," "parent computer," "server computer," "workstation," desktop computer," and the like may be used interchangeably to refer to any computing device, such as computing device 150b (see discussion of FIG. 6 below), that communicates with a mobile computing device. Examples of parent computing systems that may be used in the systems and methods of the present disclosure include, but are not limited to, general purpose computing systems, desktop computers, server computers, one or more mobile computers, and/or special purpose computing systems (such as a picture archiving and communication system (PACS) or electronic medical record system (EMR)), among others. For ease of description, the systems and methods described herein are discussed with reference to a mobile device that is used as an input device to, or is in communication with, a PACS or EMR; however, the mobile device may be used as an input device to any other type of parent computer. For example, the systems and methods discussed herein may be useful for other medical applications or outside of the medical environment for any user that wishes to customize the controls of a computing device and displayed software.

Within the present disclosure, the terms "display," "electronic display," "physical display," "monitor," and the like may be used interchangeably to refer to any type of electronic display, including for example, liquid crystal displays (LCD), plasma displays (PDP), organic light-emitting diode displays (OLED), surface-conduction electron-emitter displays (SED), field emission displays (FED), and electronic paper displays (e-paper), among others. For ease of description, the systems and methods described herein are discussed with reference to "displays," however, any of the aforementioned types of displays may be contemplated, depending on the particular embodiment.

INTRODUCTION

Disclosed herein are systems and methods for combining two or more physical electronic displays into a single electronic display. Such a combined electronic display may provide a significantly reduced cost as compared to a similarly sized single electronic displays. A combined display may also provide sizes that are currently unavailable in single electronic displays. Such combined displays may be useful in any applications, or with any computing systems, in which a large display size is desired. Combined displays as described herein may also be useful in any application in which a particular size of electronic display is needed, but the particular size is either unavailable, or is prohibitively expensive.

In various embodiments, the combined displays described here may be useful when used in conjunction with a system in which mobile computing devices, such as tablets and/or smartphones, are used as user-customizable input devices that interface with more sophisticated computer systems (or "parent computing systems"), such as PACS or EMRs. For example, when users (such as radiologists) view images and/or navigate among images on a computing system (for example, a PACS), they may use multiple displays and may use a variety of input devices such as keyboards, mouses, gaming mouses, gaming pads, track balls, touch pads, microphones, headsets, and/or boom microphones. Many PACS and EMRs currently enable users to employ keyboard or mouse features to select and/or employ functions or tools, such as magnify, roam, page, window/level, display documents, display prior reports, reorient images, etc. Current systems may also enable a user to customize various keyboard shortcuts or mouse functions, or use a touch screen, to move images on the displays. However, these displays and input methods may not be ideal in various circumstances. For example, while more information may be viewed across multiple displays, display bezels and gaps between the displays prevent contiguous viewing of images across the displays. In another example, a mouse, keyboard, gaming pad, and/or microphone may not provide a desired customizability. Different users may desire different functionality or customization of their keyboard, for example, when they interact with a PACS or EMR. Changing the functionality may be time consuming or cumbersome. Further, these input devices may create an unsanitary environment as such input devices may be used by many users of a PACS or EMR.

Described herein are systems and methods that overcome these deficiencies and disadvantages, among others not explicitly mentioned. In an embodiment, two or more displays are combined into a single combined display by removing display bezel sections that exist between the combined displays. In another embodiment, two or more display panels (such as LCD panels) are combined into a single display by providing a single combined bezel, backlight, and/or power supply to the combined display. In yet another embodiment, a display is created (e.g., by a manufacturer) using two or more display panels, such as CRT, LCD, Plasma, OLED, other display panels, that are combined to form a single display panel that share a bezel, backlight, and/or power supply in creating a larger display.

Depending on the embodiment, the methods described with reference to the flowcharts, as well as any other methods discussed herein, may include fewer or additional blocks and/or the blocks may be performed in a different order than is illustrated. Software code configured for execution on a computing device in order to perform the methods may be provided on a tangible computer readable medium, such as a compact disc, digital video disc, flash drive, hard drive, memory device or any other tangible medium. Such software code may be stored, partially or fully, on a memory of a computing device (for example, RAM, ROM, etc.), such as the computing devices 150a or 150b (see discussion of FIG. 6 below), and/or other computing devices illustrated in the figures, in order to perform the respective methods.

Mobile Device as an Input to a Parent Computing System

FIG. 1 illustrates a mobile computing device (a smartphone 102 in the example of FIG. 1) communicating with one or more parent computing systems (for example, a PACS or EMR) including two displays 104, 106, according to an embodiment of the present disclosure. In the embodiment of FIG. 1, the smartphone 102 is in communication with the parent computing system(s). As is described below in reference to FIG. 6, the smartphone 102 may communicate with the parent computing system(s) over a wireless or wired connection. As is further described in detail below in reference to FIG. 6, the smartphone 102 and the parent computing system(s) each include various components and modules that provide the functionality described.

In operation, the smartphone 102 may be paired with a parent computing system and may receive information from, and/or provide information to, the parent computing system. Communication between the smartphone 102 and the parent computing system may be established, for example, when the smartphone 102 is brought into proximity with the computing system. In an embodiment, the parent computing system may identify the smartphone 102 and/or a user of the smartphone 102. The identity of the smartphone 102 and/or the user may be used to customize the interface, input methods, information displayed, and/or other elements of the smartphone 102. The identity of the smartphone 102 and/or the user may be further used to customize the interface, input methods received, information displayed, and/or other elements of the parent computing system. In an embodiment, a user is identified by logging in (for example, providing a username and password, or other unique identifier) to the parent computing system via the smartphone 102. Alternatively, the user may be logged in to the smartphone 102, or a software application operating on the smartphone 102, and the user may be identified via communication between the smartphone 102 and parent computing system.

In the example of FIG. 1, a user is operating the smartphone 102 to view information transmitted from the parent computing system and to provide input to the parent computing system to, for example, change and/or modify the information viewed on the displays 104, 106. The user has selected to view information related to a particular patient, John Smith, by selecting the patient on the smartphone 102. In response, the parent computing system accesses and displays various information related to patient John Smith, including text, images, graphs, among other items of information, on the displays 104, 106. The user may optionally view the information directly on the smartphone 102. In an embodiment, information viewed on the smartphone 102 may be optimized for the smaller display of the smartphone 102, while information viewed on the displays 104, 106 of the parent computing system may be optimized for the larger display sizes of the parent computing system.

As explained above, the user of the smartphone 102 may view and interact with the parent computing system without the use of a directly connected, or dedicated, keyboard or mouse. The smartphone 102 may provide additional input capabilities to the parent computing system that were not previously available including, for example, a touchscreen input, an audio input, and/or scanning or photo-taking capabilities, among others. However, the displays 104, 106 may not, in some instances, provide adequate viewable area to preform desired tasks associated with the parent computing system. Accordingly, a combined display may be desired, as is described below.

Combining Physical Electronic Displays

Figure 2A:
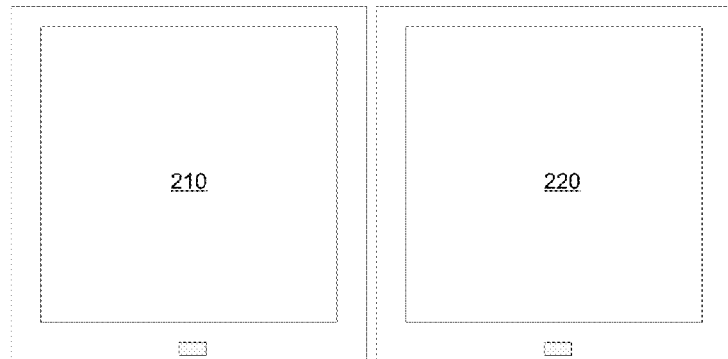
FIGS. 2A-2C illustrate a method of combining two physical displays into one physical display, according to an embodiment of the present disclosure.
Figure 2B:
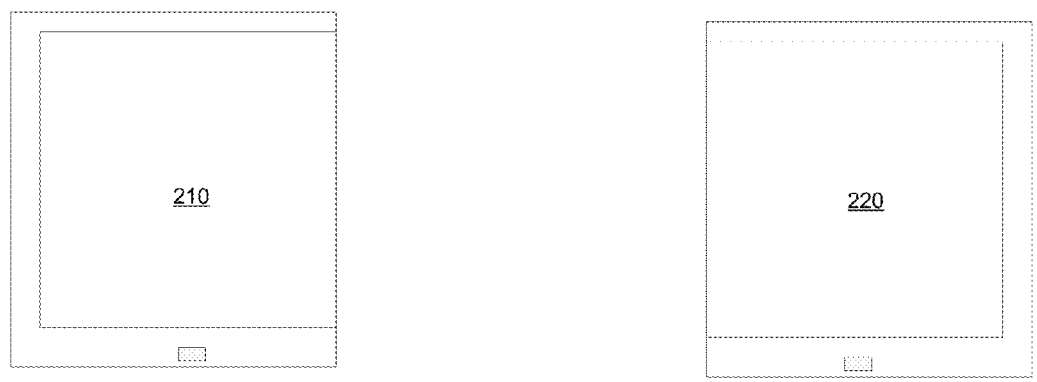
Figure 2C:
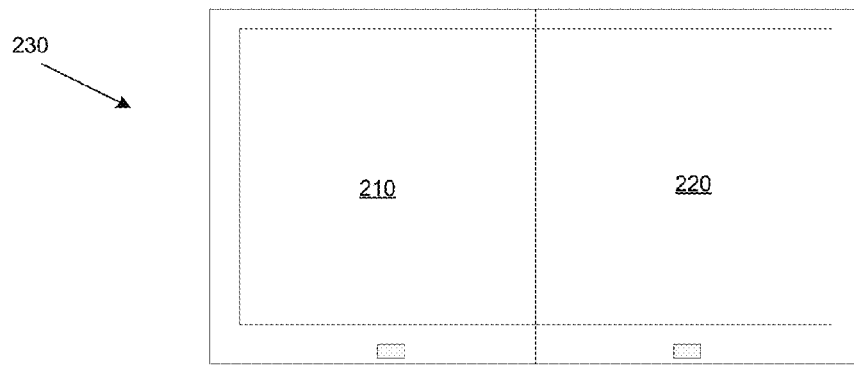

FIGS. 2A-2C illustrate a method of combining two physical displays into one physical display, according to an embodiment of the present disclosure. As noted above, a combined display may be useful in any application, or with any computing system, in which a large display size is desired. Combined displays as described herein may also be useful in any application in which a particular size of electronic display is needed, but the particular size is either unavailable, or is prohibitively expensive. The cost of display devices, for example, flat panel displays, often increases exponentially as the size of the display increases. For example, an eight megapixel flat panel display may cost 10 to 20 times as much as a four megapixel flat panel display. Thus, although many users desire higher resolution monitors, the costs associated with such higher resolution monitors may limit the availability of such monitors to many users.

Many users attempt to obtain more resolution and/or a larger display by placing multiple monitors side-by-side, such as shown in the example of FIGS. 1 and 2A. However, the bezels of the displays 210 and 220 (of FIG. 2A) in this configuration create a barrier that may interfere with the user's ability to view images (for example, images that span across multiple monitors at a high resolution), groups of images (for example, images of an imaging series, such as a medical imaging series, that the user wishes to view concurrently), and/or other data that spans multiple monitors. Additionally, the bezels (for example, the right bezel in monitor 210 and the left bezel in monitor 220) increase the distance that the user must shift their vision in order to view data on the monitors.

In order to address certain of the limitations noted in the present disclosure, multiple monitors may be combined to create lower-cost increased size monitors that include substantially no barrier between the monitors (for example, caused by monitor bezels). As shown in FIG. 2B, each of the monitors 210 and 220 have their inside bezels removed (for example, the right side bezel on monitor 210 and the left side bezel on monitor 220). In one embodiment, the monitors 210 and 220 are widely available monitors, such as monitors that a typical computer user may purchase at an electronics or department store. Depending on the embodiment, the inside bezels may be removed by various means, such as by sawing, cutting, or removing one or more pieces of a multi-piece bezel. With the inside bezels removed, monitors 210 and 220 can be joined in order to form a unified larger monitor 230 (FIG. 2C). In this example, monitor 230 has twice the screen resolution as each of the individual monitors 210 and 220, but may cost significantly less than a single monitor having the combined resolution of monitor 230. Depending on the embodiment, the monitors can be coupled to one another in various manners, such as via a temporary or permanent attachment means. For example, in one embodiment the monitors are joined via a metal bracket that is attached to each of the monitors, such as with screws. Joining of additional monitors, such as three or more monitors, in this manner is also possible.

In one embodiment, a larger bezel (or casing) may be placed on the unified larger monitor 230 to cover signs of the cutting and/or attachment of the two monitors 210 and 220. For example, a single bezel may be sized to replacing the remaining bezel on monitor 210 and 220 or to fit over the remaining bezel on monitor 210 and 220. In either case, the larger bezel can give the unified monitor 230 a more unified look.

In one embodiment, one or both of the monitors 210 and 220 include an integrated computing system (such as in an iMac). In such embodiments, the unified monitor 230 may operate under instructions of the integrated computing system.

FIGS. 3A-3B illustrate another method for combining two physical displays into one physical display, according to an embodiment of the present disclosure. In this embodiment, various components of the display may be removed, replaced, and/or added to create the combined display.

FIG. 3A shows three components of a combined display, including a shared backlight 302, LCD panels 304 and 306, and a single unified bezel 308. In this embodiment, the two LCD panels 304, 306 (and/or any other type of display panels) may be combined with the shared backlight 302 and the single unified bezel 308 to create a unified and/or combined display. FIG. 3B shows a completed assembled combined display 310, including the shared backlight 302, the LCD panels 304 and 306, and the shared bezel 308. Thus, in one embodiment a manufacturer, for example, may create large displays (e.g., display 310) using smaller (and possibly less expensive and more easily available) display panels (e.g., panels 304 and 306). For example, a manufacturer may combine display panels in this manner in order to make use of smaller display panels that may be easier to manufacture.

In another embodiment, two preexisting displays (already including various individual components) may be combined. In this embodiment, when the two preexisting displays are combined, the backlights of each separate display may be replaced by a single shared backlight. Additionally, a single unified bezel may replace the preexisting bezels of the separate displays, resulting in a combined display 310.

In an embodiment, various other display components may be shared in the combined display, depending on the costs of the components and the display technology. Examples of components that may be shared in the combined display include, for example, a backlight, elements/components of an optical system (including a light guide plate, a diffuser film, and a prism film), a front or back glass plate, a bezel, a housing or case, a stand, an interface to an image source (e.g., a cable to plug into a computer), and/or a power supply, among others. In various embodiments in which preexisting displays are combined, one or more of these components may be replaced on individual preexisting displays with shared components on the unified/combined display. Use of one or more of these shared components may be desirable to reduce the cost of the combined display, and/or to improve the look and/or operation of the combined display, among others. For example, providing a shared backlight in the combined display may provide the advantage of eliminating a problem of differing brightness levels between the various individual displays panels of the combined display.

In various embodiments, more than two displays may be combined using the methods described. Further, the combined displays may be arranged in any configuration, including arrays and matrices. For example, four displays may be arranged in a two-by-two configuration, or three displays may be arranged in a one-by-three configuration.

Figure 4A:
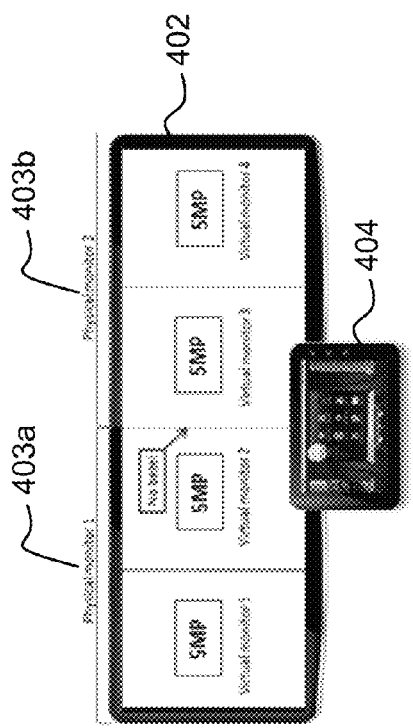
FIGS. 4A-4C illustrate a system in which a tilt angle of a combined physical display is an input to a computing device, according to an embodiment of the present disclosure.
Figure 4B:
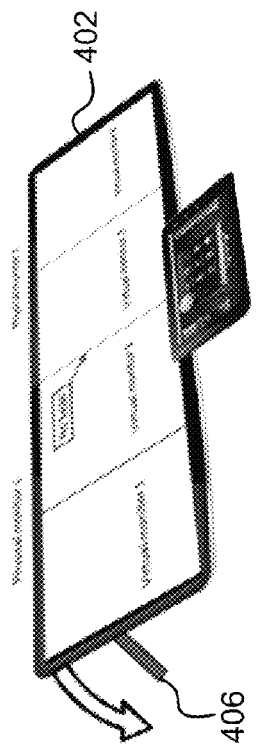
Figure 4C:
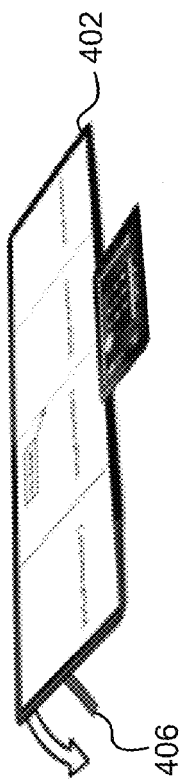

FIGS. 4A-4C illustrate two monitors 403a, 403b that have been joined according to one or more embodiments of the present disclosure. Further, FIGS. 4A-4C illustrate a system in which a tilt angle of combined monitors 402 is used an input to a computing device, according to an embodiment of the present disclosure. In this embodiment, each of the physical monitors 403a, 403b displays two virtual monitors, each being allotted five megapixels of the physical displays. Division of the physical monitors into virtual monitors can further increase the number of side-by-side monitors available for viewing and interaction with the user. In this embodiment, a tablet 404 is used as an input device to the unified monitor 402 that includes four side-by-side five megapixel virtual monitors.

The combined monitor/display 402 may be a display of, for example, a parent computing system (such as a PACS), and may display information from that parent computing system. As described above, a mobile computing device 404 may be in communication with the parent computing system, and may allow a user of the mobile computing device to provide input to, and/or view information displayed from, the parent computing system.

In the embodiment of FIGS. 4A-4C, the display 402 also includes a leg 406 that allows the display to be tilted to various angles, although other mechanisms may be used to allow the display to be tilted. In an embodiment, the display 402 and/or computing system coupled to the display includes hardware and/or software devices and/or modules configured for determining a tilt angle of the display, such as one or more accelerometers or video cameras. The display 402 additionally displays four virtual monitors or displays. Each virtual monitor may display information from the same parent computing system, or from one or more different parent computing systems.

The tilt angle of the display 402 may be used in customizing interactions that are available to a user. For example, depending on how far back the display is tilted, the system may automatically change the way the input works. In an embodiment wherein the system includes one or more cameras (for example, built into one or more of the monitors and/or separate cameras) that are configured to detect movement of the user and to determine gestures provided by the user, gesture detection hardware and/or software may be activated and deactivated based on the angle of the monitor. For example, a first user may have a preference indicating that when the monitor is tilted less than 30 degrees from the table (or other support), the gesture detector is disabled (for example, the camera may be turned off and/or the gesture detection software may be disabled), but if the monitor is tilted 80 degrees or more relative to the table, the gesture detector is enabled. Thus, a user may move the monitor to be in a more or less table top position where a first input method (for example, touchpad or touchscreen) is in control, and then when the monitor is titled more upright a second input method (for example, gestures) may be used, possibly in combination with the first input method also. Preferences for enabling and disabling gesture detection functionality may be customized by a user, user group, or system level, for example.

In an embodiment, the tilt angle detection and input customization described above may be implemented on the mobile computing device that is in communication with the parent computing system.

Example Method

Figure 5A:
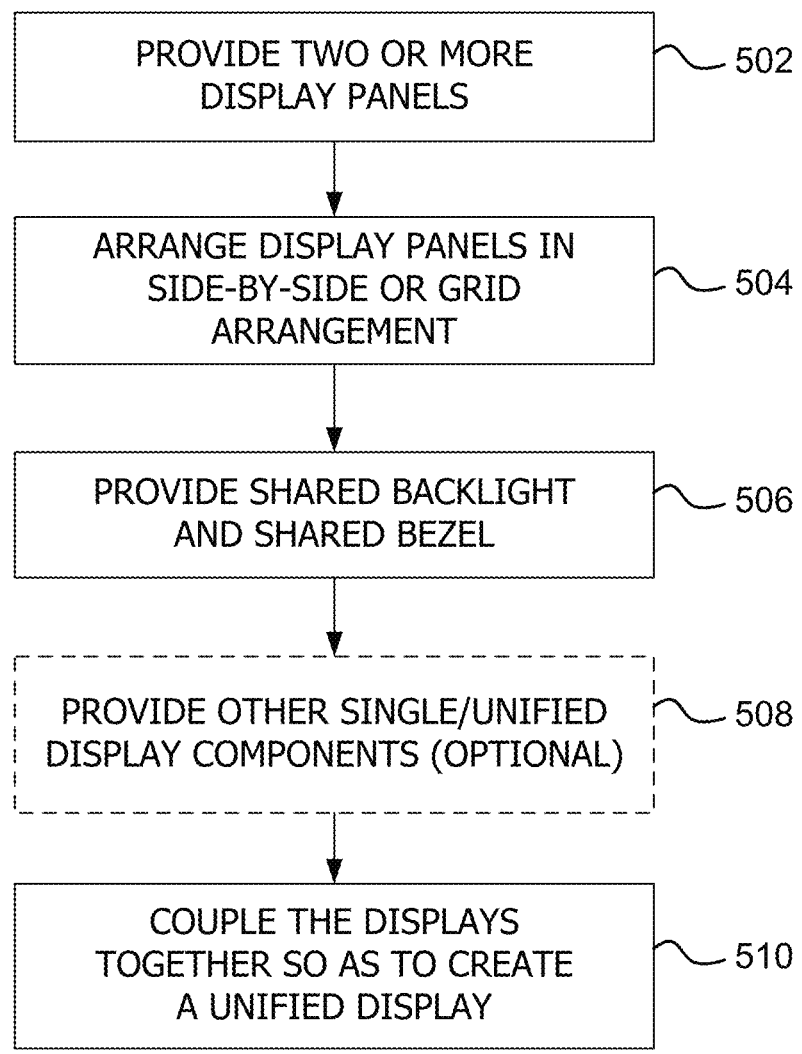
FIGS. 5A and 5B are flowcharts depicting illustrative methods of combining two physical displays, according to embodiments of the present disclosure.
Figure 5B:
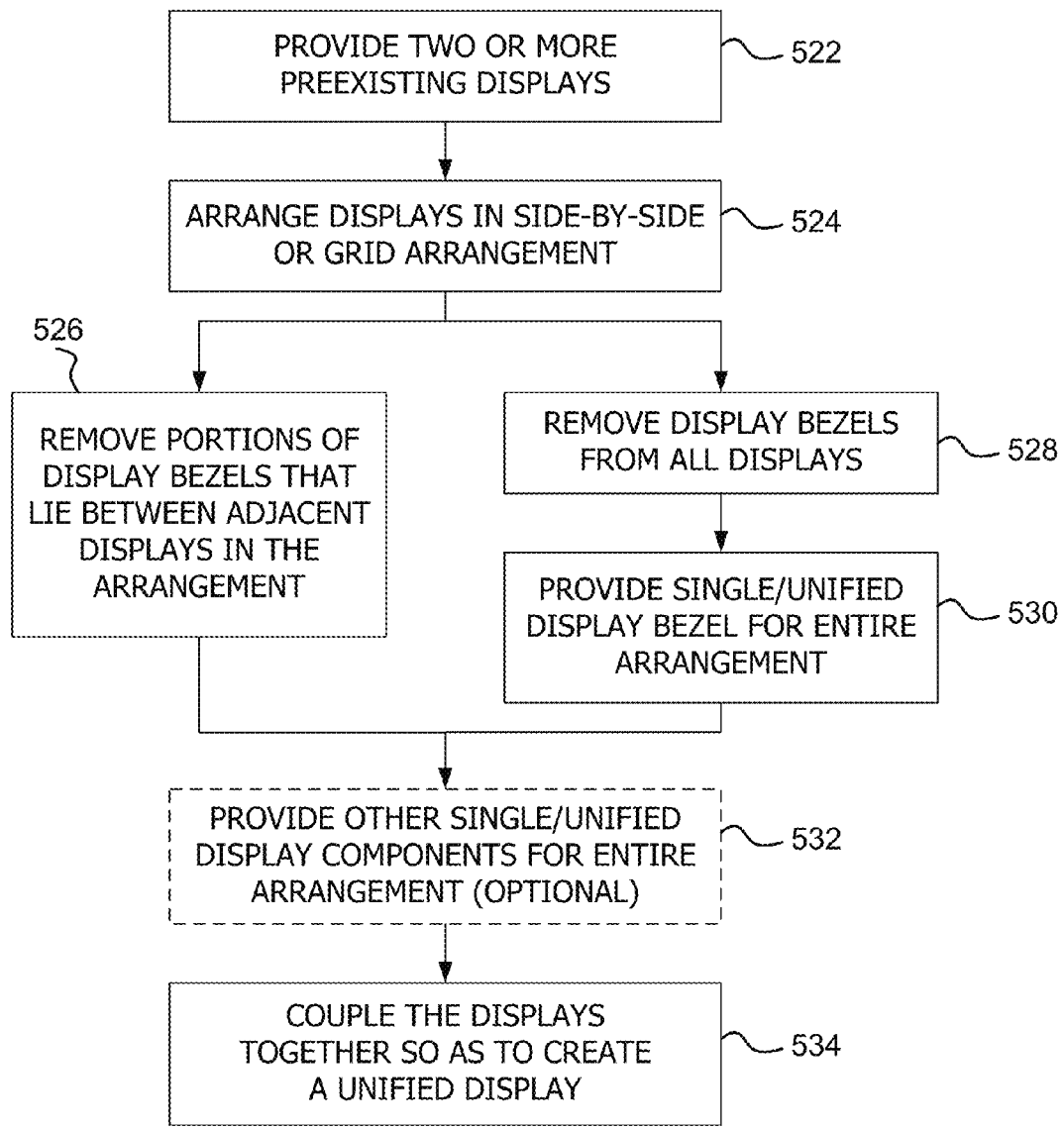

FIGS. 5A and 5B are flowcharts depicting an illustrative method of combining two physical displays, according to embodiments of the present disclosure. In various embodiments, the methods described may include additional or fewer blocks and/or the blocks may be performed in a different order than is illustrated.

Referring now to FIG. 5A, initially, at block 502, two or more display panels (such as LCD panels) are provided. The display panels may be "bare" panels, such as those that are received directly from the panel manufacture and which require coupling to appropriate electronics (e.g., backlight, power supply, etc.) in order to be operational.

At block 504, the display panels are arranged in a determined configuration. For example, as described above, the display panels may be arranged in any configuration desired. Depending on the embodiment, the arrangement of panels may be performed automatically, such as by robotics included in an assembly line, or manually.

At block 506, as described above in reference to FIGS. 3A-3B, a shared backlight and a shared bezel are provided. At optional block 508, and as further described above in reference to FIGS. 3A-3B, other single, unified display components (for example, a backlight, elements of an optical system (including a light guide plate, a diffuser film, and a prism film), a front or back glass plate, a housing or case, a stand, and/or a power supply, among others) may optionally be provided.

At block 510, the display panels and the shared components (including the provided backlight, bezel, and any additional components) are coupled together and/or assembled to create a single, unified display. Depending on the embodiment, the display panels may be coupled to one another in various manners, such as via a temporary or permanent attachment means. For example, in one embodiment the display panels and various components are joined via metal brackets that are attached to the displays and/or display components, such as with screws and/or adhesives. Joining of additional display panels, such as three or more display panels, in this manner is also possible, as described above.

Additional example mechanisms for joining and/or coupling the two or more display panels may include, but are not limited to, adhering or bonding (such as with glue, tape, or by melting), welding (or otherwise chemically or molecularly bonding), and/or fastening (such as with screws, nails, brackets, housings, among others), among other means. Any suitable material may be used for joining and/or coupling the two or more monitors including, but not limited to, metals (including alloys), polymers (such as plastics), ceramics, glass, and/or composites (including fiber composites), among others.

Turning now to FIG. 5B, additional embodiments of combining displays are described. Initially, at block 522, two or more preexisting displays are provided which are to be combined. At block 524, the arrangement of the displays is determined. For example, as described above, the displays may be arranged in any configuration desired.

At block 526, and as described in reference to FIGS. 2A-2C above, the portions of the display bezels that lie between adjacent displays may be removed. Alternatively, at blocks 528 and 530, and as described in reference to FIGS. 3A-3B above, display bezels may be removed from all of the displays, and a single, unified bezel may be provided for the combined displays.

At optional block 532, and as described above in reference to FIGS. 3A-3B, other single, unified display components (for example, a backlight, elements of an optical system (including a light guide plate, a diffuser film, and a prism film), a front or back glass plate, a housing or case, a stand, and/or a power supply, among others) may optionally be provided to replace the separate components of each individual display.

At block 534, the displays are all coupled together and assembled with any replacement components to create a single, unified display. As described above at block 510 of FIG. 5A, depending on the embodiment, the displays may be coupled to one another in various manners, such as via a temporary or permanent attachment mechanisms.

Other Aspects of Using a Mobile Device as an Input to a Parent Computing System

As mentioned above with reference to FIG. 1, mobile computing devices, such as tablets and/or smartphones, may be used as user-customizable input devices that interface with more sophisticated computer systems (or "parent computing systems"), such as PACS or EMRs, having a unified display. In an embodiment, a mobile computing device, such as a tablet computing device, may be used as an input device that controls another computing device, such as a desktop, server, and/or workstation computing device (such as a PACS or EMR) that has increased processing power over the mobile computing device. Advantageously, the mobile computing device may be customized for a particular user and/or for interaction with a particular workstation. Additionally, the mobile device may provide input and/or display capabilities that were not previously available at the workstation including, for example, a touchscreen, an audio input, scanning and/or photo-taking capabilities, among others. Further, each user of such systems and methods may use a unique mobile computing device as an input to a workstation, thereby preventing the spread of infection or other unsanitary conditions.

In one embodiment, the tablet may display a modifiable image that simulates a standard QWERTY keyboard. The user may employ a graphical user interface to customize the input display, such as a virtual keyboard. In one embodiment, the input display characteristics (for example, layout of keys of a virtual keyboard and functions associated with those keys) are associated with a particular user (or group of user) and stored for later use by the user with various computing devices. For example, user preferences may be provided by individual users such that the individual user preferences (such as custom input displays) may be automatically accessed by a PACS or EMR (or other computing system) when the PACS or EMR detects a particular individual. Detection of a particular user may be accomplished, for example, by detecting a tablet that belongs to a particular individual (or a particular individual has logged in to) and/or receiving login information of a user at the PACS or EMR (for example, a login/password, biometric data, or a video-detected gesture that identifies a particular individual).

In various embodiments, storage of the user's keyboard (or other input type) customization may be local, and/or may be stored on another computer in a local area network, wide area network, or cloud accessible by the PACS, EMR, and/or workstation. In this embodiment, any tablet used by the user to interface with any server may be configured automatically to include the user's keyboard customizations, whether or not the user had used the server or tablet previously. Alternatively, keyboard customizations may be stored on the tablet so that a user that has custom input display(s) stored on his tablet may walk up to another workstation, attach the tablet via a USB or other method (including wireless methods) and the customizations available on the tablet may be employed to control the program running on that computer.

Example Computing Systems

Figure 6:
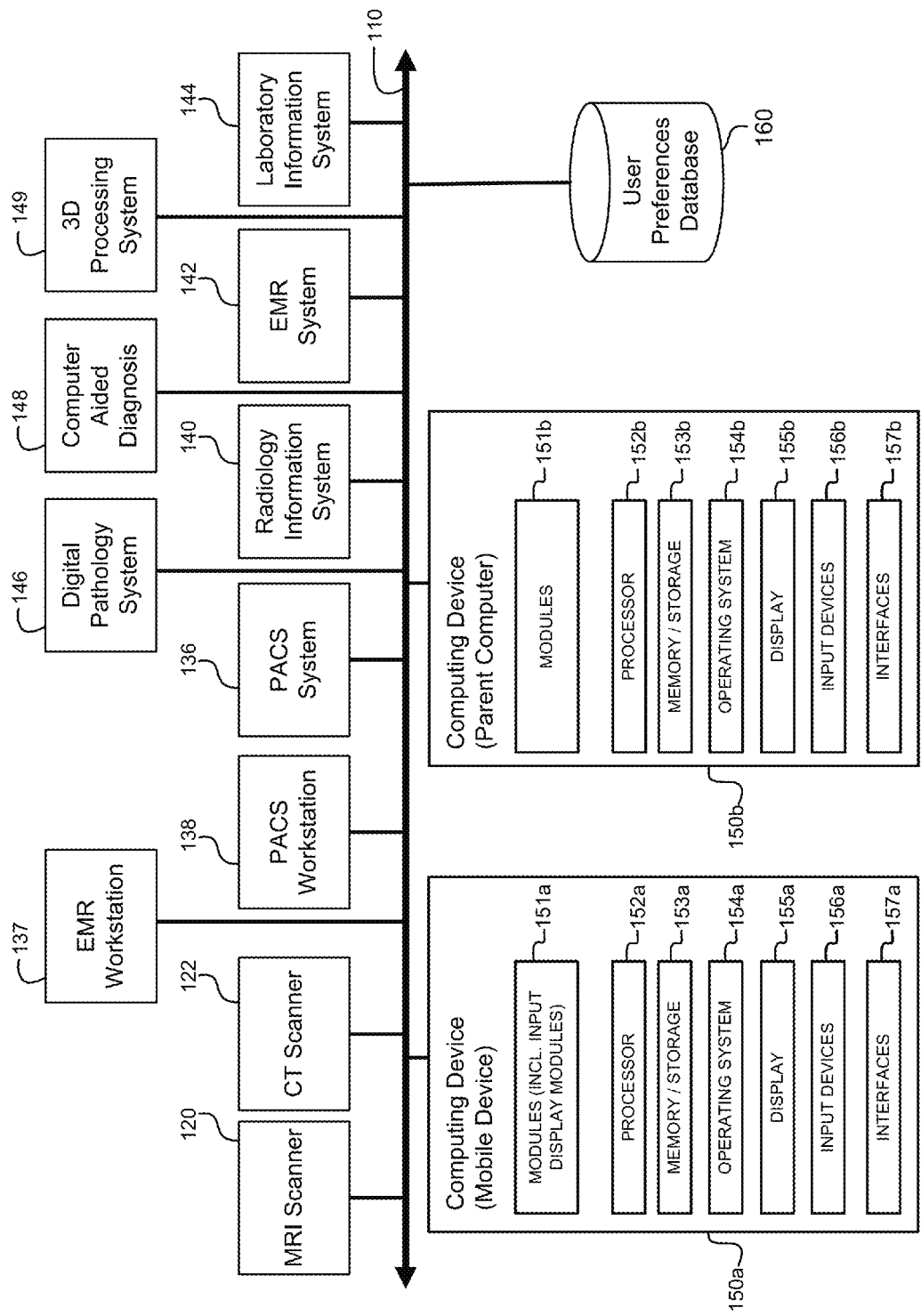
FIG. 6 is a system diagram showing various example components of a system, including a combined physical display, in which a mobile computing device functions as an input device for various parent computing systems, according to various embodiments of the present disclosure.

FIG. 6 is a system diagram showing various example components of a system, including a combined physical display, in which a mobile computing device functions as an input device for various parent computing systems, according to various embodiments of the present disclosure. The diagram of FIG. 6 includes a mobile computing device 150a (for example, a tablet or smartphone) that may to serve as an input device for a parent computing system. Examples of parent computing systems include a generic parent computing device 150b, and various other specialized computing systems including an MRI scanner 120, a CT Scanner 122, an EMR Workstation 137, a PACS Workstation 138, a PACS System 136, a Digital Pathology System 146, a Radiology Information System 140, a Computer Aided Diagnosis System 148, an EMR System 142, a 3D Processing System 149, and a Laboratory System 144.

In the embodiment of FIG. 6, the mobile computing device 150a is in communication with the parent computing device 150b, such as a PACS, via any available communication medium 110, such as network communication (for example, a local area network), a wired connection (for example, a cable connected directly to the tablet and a USB port of the PACS), and/or a wireless connection (for example, a Bluetooth connection). In other embodiments, the mobile computing device 150a may communicate with the parent computing device via other communication mediums.

Depending on the embodiment, the mobile computing device 150a may have computational power that is much less than the parent computing device. However, as shown by blocks 151a, 152a, 153a, 154a, 155a, 156a, and 157a, the mobile computing device 150a may include many or all of the same components that are discussed below with reference to the parent computing device 150b. For example, the mobile computing device 150a may include a processor, memory, and an operating system that are similar to those discussed below with reference to the parent computing device 150b.

In an embodiment, the mobile computing device 150a includes input display modules, which are generally the software that allows the mobile computing device 150a to perform the functions discussed above. For example, the input display modules on the mobile computing device 150a allow the user to define custom input displays, order the input displays, define transitions between the input displays, etc. The parent computing device 150b likewise has modules that allow the parent computing device 150b to interface with the input display modules of the mobile computing device 150a.

Discussed hereinafter are example features of the parent computing device 150b, but as discussed above, the mobile computing device 150a may include any combination of the components discussed below, as well as any other suitable components. Thus, the following description of the operation and functionality of the components of the parent computing device 150b should be understood to similarly apply to the components of the mobile computing device 150a.

In an embodiment, the parent computing device comprises a server, a desktop computer, a workstation, a PACS workstation, a laptop computer, a mobile computer, a smartphone, a tablet computer, a cell phone, a personal digital assistant, a gaming system, a kiosk, an audio player, any other device that utilizes a graphical user interface, including office equipment, automobiles, airplane cockpits, household appliances, automated teller machines, self-service checkouts at stores, information and other kiosks, ticketing kiosks, vending machines, industrial equipment, and/or a television, for example.

The parent computing device may take various forms. In one embodiment, the parent computing device may be a parent computing device having modules 151b, such as software modules. In other embodiments, modules 151b may reside on another computing device, such as a server (for example, a web server or other server), and the user directly interacts with a second computing device that is connected to the web server via a computer network. In one embodiment, the modules 151b include some or all of the software components to implement the functionality of the systems and methods described above.

The computing device 150b may run an off-the-shelf operating system 154b such as a Windows, Linux, MacOS, Android, or iOS, or mobile versions of such operating systems. The computing device 150b may also run a more specialized operating system which may be designed for the specific tasks performed by the computing device 150b, or any other available operating system.

The computing device 150b may include one or more computing processors 152b. The computer processors 152b may include central processing units (CPUs), and may further include dedicated processors such as graphics processor chips, or other specialized processors. The processors generally are used to execute computer instructions based on the information display software modules 151b to cause the computing device to perform operations as specified by the modules 151b. The modules 151b may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. For example, modules may include software code written in a programming language, such as, for example, Java, JavaScript, ActionScript, Visual Basic, HTML, C, C++, or C#. While "modules" are generally discussed herein with reference to software, any modules may alternatively be represented in hardware or firmware. Generally, the modules described herein refer to logical modules that may be combined with other modules or divided into sub-modules despite their physical organization or storage.

The computing device 150b may also include memory 153b. The memory 153b may include volatile data storage such as RAM or SDRAM. The memory 153b may also include more permanent forms of storage such as a hard disk drive, a flash disk, flash memory, a solid state drive, or some other type of non-volatile storage.

The computing device 150b may also include or be interfaced to one or more display devices 155b that provide information to the users. Display devices 155b may include a video display, such as one or more high-resolution computer monitors, or a display device integrated into or attached to a laptop computer, handheld computer, smartphone, computer tablet device, or medical scanner. In other embodiments, the display device 155b may include an LCD, OLED, or other thin screen display surface, a monitor, television, projector, a display integrated into wearable glasses, or any other device that visually depicts user interfaces and data to viewers.

The computing device 150b may also include or be interfaced to one or more input devices 156b which receive input from users, such as a keyboard, trackball, mouse, 3D mouse, drawing tablet, joystick, game controller, touch screen (for example, capacitive or resistive touch screen), touchpad, accelerometer, video camera and/or microphone.

The computing device 150b may also include one or more interfaces 157b which allow information exchange between computing device 150b and other computers and input/output devices using systems such as Ethernet, Wi-Fi, Bluetooth, as well as other wired and wireless data communications techniques. For example, the interfaces 157b may allow the computing device to communicate with various other devices via the computer network 110, which may take various forms. The computer network 110 may be a wired network or a wireless network, or it may be some combination of both. The computer network 110 may be a single computer network, or it may be a combination or collection of different networks and network protocols. For example, the computer network 110 may include one or more local area networks (LAN), wide area networks (WAN), personal area networks (PAN), cellular or data networks, and/or the Internet.

The modules of computing device 150b may be connected using a standard based bus system. In different embodiments, the standard based bus system could be Peripheral Component Interconnect ("PCI"), PCI Express, Accelerated Graphics Port ("AGP"), Micro channel, Small Computer System Interface ("SCSI"), Industrial Standard Architecture ("ISA") and Extended ISA ("EISA") architectures, for example. In addition, the functionality provided for in the components and modules of computing device 150 may be combined into fewer components and modules or further separated into additional components and modules. Various other devices and subsystems may be connected to the network 110. For example, one or more medical scanners may be connected, such as MRI scanners 120. The MRI scanners 120 may be used to acquire MRI images from patients, and may share the acquired images with other devices on the network 110. One or more CT scanners 122 may also be coupled to the network 110. The CT scanners 122 may also be used to acquire images and, like the MRI scanner 120, may then store those images and/or share those images with other devices via the network 110. Any other scanner or device capable of inputting or generating information that can be presented to the user as images, graphics, text, or sound, including ultrasound, angiography, nuclear medicine, radiography, endoscopy, pathology, dermatology, etc.

Also connected to the network 110 may be a Picture Archiving and Communications System (PACS) 136 and/or PACS workstation 138. The PACS 136 is typically used for the storage, retrieval, distribution and presentation of images (such as those created and/or generated by the MRI scanner 120 and CT Scanner 122). The medical images may be stored in an independent format, an open source format, or some other proprietary format. A common format for image storage in the PACS system is the Digital Imaging and Communications in Medicine (DICOM) format. The stored images may be transmitted digitally via the PACS system, often reducing or eliminating the need for manually creating, filing, or transporting film jackets.

Also connected to the network 110 may be a Radiology Information System (RIS) 140. The radiology information system 140 is typically a computerized data storage system that is used by radiology departments to store, manipulate and distribute patient radiological information such as radiology reports.

Also attached to the network 110 may be an Electronic Medical Record (EMR) system 142. The EMR system 142 may be configured to store and make accessible to a plurality of medical practitioners computerized medical records. Also attached to the network 110 may be a Laboratory Information System 144. Laboratory Information System 144 is typically a system which stores information created or generated by clinical laboratories. Also attached to the network 110 may be a Digital Pathology System 146 used to digitally manage and store information related to medical pathology.

Also attached to the network 110 may be a Computer Aided Diagnosis System (CAD) 148 used to analyze images. In one embodiment, the CAD 148 functionality may reside in a computing device separate from the computing device 150 while in another embodiment the CAD 148 functionality may reside within the computing device 150b.

Also attached to the network 110 may be a 3D Processing System 149 used to perform computations on imaging information to create new views of the information, for example, 3D volumetric display, Multiplanar Reconstruction (MPR) and Maximum Intensity Projection reconstruction (MIP). In one embodiment, the 3D Processing functionality may reside in a computing device separate from computing device 150b while in another embodiment the 3D Processing functionality may reside within the computing device 150b.

Also connected to the network 110 may be a user preference database 160. In an embodiment, the user preference database 160 may be implemented as one or more databases or may be implemented using a relational data structure, such as Sybase, Oracle, CodeBase and Microsoft® SQL Server as well as other types of data structures such as, for example, a flat file data structure, an entity-relationship data structure, an object-oriented data structure, and/or a record-based data structure. Examples of information that may be stored in the user preference database 160 include user input display preferences, user input configuration preferences, device characteristics information, user identification information, and the like.

In other embodiments, other computing devices that store, provide, acquire, and/or otherwise manipulate medical data may also be coupled to the network 110 and may be in communication with one or more of the devices illustrated in FIG. 6, such as with the mobile computing device 150a and/or the parent computing device 150b.

Depending on the embodiment, the other devices illustrated in FIG. 6 (besides the computing devices 150a, 150b) may include some or all of the same components discussed above with reference to the computing devices 150a, 150b. Other Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flowcharts described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by an Information Display Computing Device and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of combining electronic displays, the method comprising:
   providing a first electronic display and a second electronic display, each manufactured with a bezel surrounding a display panel, wherein the bezels are not intended for removal from the electronic displays;
   determining a particular arrangement of the first and second electronic displays with reference to one another;
   based on the particular arrangement, removing a first bezel on at least a first side of the first electronic display and a second bezel on at least a second side of the second electronic display, wherein the first side and the second side are opposite sides; and
   physically coupling the first and second electronic displays together in the particular arrangement so that the first side of the first electronic display directly abuts the second side of the second electronic display in order to create a unified electronic display.

2. The method of claim 1, further comprising:
   providing a third electronic display manufactured with a bezel surrounding a display panel;
   determining a second particular arrangement of the third electronic display with reference to the first and second electronic displays; and
   based on the second particular arrangement, removing a third bezel on at least a third side of the third electronic display and at least a fourth side of at least one of the first and second electronic displays, wherein the third side and the second side are opposite sides; and physically coupling the third electronic display to the first and second electronic displays in the second particular arrangement so that the third side of the third electronic display directly abuts the fourth side of the at least one of the first and second electronic displays in order to create a unified electronic display.

3. The method of claim 1, wherein physically coupling the first and second electronic displays together comprises at least one of adhering, bonding, welding, or fastening.

4. The method of claim 1, wherein the unified electronic display includes a tilt angle detection device.

5. The method of claim 4, wherein the unified electronic display is in communication with a parent computing system, wherein the parent computing system is configured to generate a user interface, wherein the unified electronic display is configured to provide the user interface to a user of the parent computing system, and wherein the parent computing system is configured to customize the user interface provided by the unified electronic display based at least in part on a detected tilt angle of the unified electronic display.

6. The method of claim 5, wherein the parent computing system is configured to customize one or more user interaction options associated with parent computing system based at least in part on a detected tilt angle of the unified electronic display.

7. The method of claim 1, wherein the unified electronic display is in communication with a parent computing system, wherein the parent computing system is configured to receive input from a mobile computing device operated by a user, and wherein the unified electronic display is configured to display information communicated from the parent computing system in response to input from the mobile computing device.

8. A method of combining electronic displays, the method comprising:
    providing a first electronic display and a second electronic display, each configured to independently receive input data and display representations of said input data;
    determining a particular arrangement of the two electronic displays with reference to one another;
    based on the particular arrangement, removing a bezel on at least a first side of the first electronic display and on at least a second side of the second electronic display, wherein the first side and the second side are opposite sides;
    physically coupling the two electronic displays together in the particular arrangement so that the first side of the first electronic display directly abuts the second side of the second electronic display in order to create a unified electronic display;
    providing one or more shared display components including at least a shared backlight;
    removing an existing backlight from each of the first and second electronic displays; and
    coupling the shared backlight to the unified electronic display in order to replace the removed backlights.

9. The method of claim 8, wherein the one or more shared display components further comprises one or more shared components of an optical system, wherein the method further comprises:
    in addition to removing the existing backlight, removing one or more existing components of an optical system from each of the first and second electronic displays; and
    coupling the one or more shared components of an optical system to the unified electronic display in order to replace the removed one or more optical system components.

10. The method of claim 9, wherein the one or more shared components of the optical system include at least one of a light guide plate, a diffuser film, or a prism film.

11. The method of claim 8, wherein the one or more shared display components further comprises a shared bezel and/or shared display housing, wherein the method further comprises:
    removing any existing bezel and/or display housing from each of the first and second electronic displays; and
    coupling the shared bezel and/or shared display housing to the unified electronic display in order to replace the removed bezel and/or display housing.

12. The method of claim 8, wherein the one or more shared display components further includes at least one of a front glass plate, a back glass plate, a stand, a video input port, or a power supply.

13. The method of claim 8, wherein the one or more shared display components are manufactured to fit the physically coupled two or more electronic displays.

14. The method of claim 8, wherein the one or more shared display components comprise a video input port configured to receive video data for each of the two or more electronic displays.

15. The method of claim 8, wherein the one or more shared display components comprise a power supply having a single power cord and configured to provide power to each of the two or more electronic displays.

16. A method of combining two or more electronic displays, the method comprising:
    providing two or more electronic displays, each manufactured with a bezel surrounding a display panel, wherein the bezels are not intended for removal from the electronic displays;
    determining a particular arrangement of the two or more electronic displays;
    removing an entire bezel from each of the two or more electronic displays;
    providing a shared bezel based on the particular arrangement;
    physically coupling each of the two or more electronic displays together in the particular arrangement in order to create a unified electronic display; and
    physically coupling the shared bezel to the unified electronic display.

17. The method of claim 16, further comprising:
    providing one or more shared display components; and
    coupling the one or more shared display components to the unified electronic display.

18. The method of claim 17, wherein the one or more shared display components include at least one of a light guide plate, a diffuser film, a prism film, a front glass plate, a back glass plate, a housing, a stand, a video input port, or a power supply.

19. The method of claim 16, further comprising:
    providing a shared backlight;
    removing an existing backlight from each of the two or more electronic displays; and
    coupling the shared backlight to the unified electronic display in order to replace the removed backlights.

20. The method of claim 19, further comprising:
    providing one or more shared optical system components;
    in addition to removing the existing backlight, removing one or more existing components of an optical system from each of the two or more electronic displays; and
    coupling the one or more shared optical system components to the unified electronic display in order to replace the removed one or more optical system components.

21. The method of claim 16, wherein the unified electronic display includes a tilt angle detection device.

22. The method of claim 16, wherein the unified electronic display is in communication with a parent computing system, wherein the parent computing system is configured to receive input from a mobile computing device operated by a user, and wherein the unified electronic display is configured to display information communicated from the parent computing system in response to input from the mobile computing device.

\* \* \* \* \*